July 19, 1927.
S. W. NICHOLSON
HANDLE ASSEMBLY
Filed April 7, 1924
1,636,011
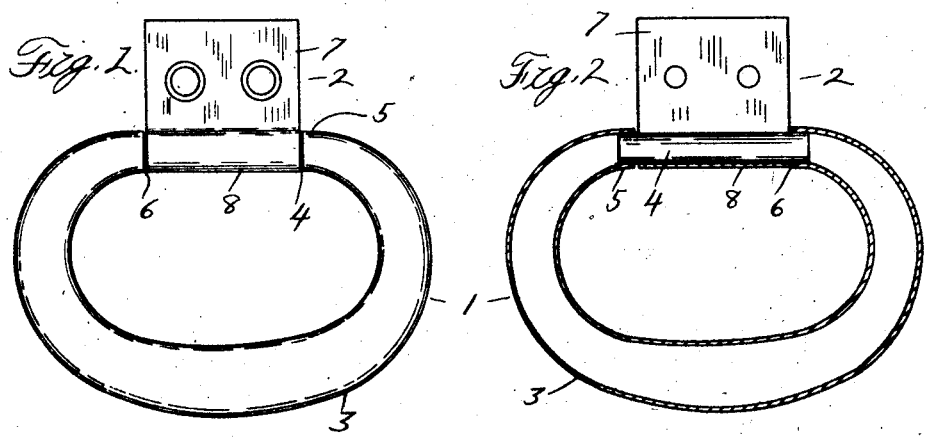
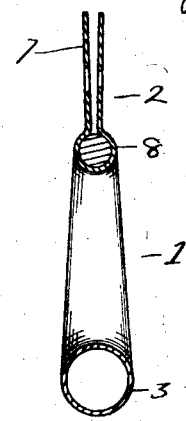
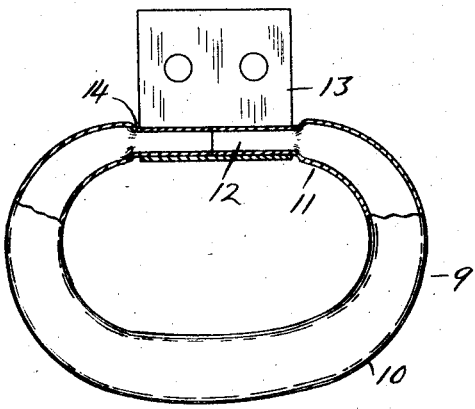
Inventor
Stanley W. Nicholson
Attorneys Patented July 19, 1927.

1,636,011

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

HANDLE ASSEMBLY.

Application filed April 7, 1924. Serial No. 704,897.

The invention relates to handle assemblies and refers more particularly to the drop type of pull-to handle assembly. One of the objects of the invention is to reduce the cost of manufacture of the handle assembly. Another object is to decrease the weight of the handle assembly. With these as well as other objects in view, the invention resides in the novel features of construction and combinations and arrangements of parts as more fully hereinafter set forth.

In the drawings:

Figure 1 is a side elevation of a handle assembly embodying my invention;

Figure 2 is a longitudinal section therethrough;

Figure 3 is a transverse section therethrough;

Figure 4 is a sectional side elevation of a modified construction of handle.

1 is the handle and 2 the support therefor. The handle comprises the body portion 3 and the bearing portion 4, the former of which is formed of tubing curved to the desired shape and having the spaced inturned end portions 5 which extend toward each other. The bearing portion 4 is formed of a cylindrical member such as a rod which telescopically engages within the inturned end portions 5 and is secured thereto by suitable means such as solder. With this arrangement the bearing portion 4 forms with the body portion 3 a continuous handle, and furthermore annular shoulders 6 are formed by the ends of the end portions of the body portion. The support 2 is a U-shaped clip having the legs 7 and the cylindrical bearing portion 8 connecting the same and engaging the bearing portion 4 of the handle, the edges of this clip being engageable with the shoulders 6 of the handle to limit the movement of the handle relative to the clip.

By forming the handle of tubing which is curved to shape and of a rod telescopically engaging the inturned ends of the tubing and forming with the tubing a continuous handle, the cost of manufacture of the handle is decreased as is also its weight. Furthermore, the shoulders for limiting the relative movement of the handle and its support are provided.

As shown in Figure 4, the handle 9 is formed of one continuous length of tubing which is curved to the desired shape providing the body portion 10, the inturned portions 11 extending toward each other, and the reduced portion 12 at the ends of the inturned portions 11 and abutting each other, these reduced portions being formed by a swaging operation and producing the bearing portion of the handle. The support or clip 13 for the handle is engageable with these reduced portions and its edges are located between and are adapted to abut the shoulders 14 formed between the inturned and reduced portions 11 and 12 respectively.

What I claim as my invention is:

1. In a handle assembly, the combination with a handle comprising a tubular member having spaced end portions extending toward each other, and a second member telescopically engaging said end portions and cooperating therewith to form shoulders, of a support for said handle engaging one of said members and also engageable with said shoulders to limit the relative movement of said handle and support.

2. In a handle assembly, the combination with a handle comprising a tubular member curved to shape and having spaced end portions extending toward each other, and a second member telescopically engaging within said end portions, of a support for said handle in which said second member is journalled, said support being engageable with the ends of said spaced end portions to limit the relative movement of said handle and support.

3. In a handle assembly, the combination with a handle comprising tubing curved to shape and having spaced inturned end portions extending toward each other, and a rod extending between and telescopically engaging within said end portions, of a support for said handle comprising a clip having a bearing portion in which said rod is journalled, the edges of said clip being engageable with the ends of said end portions to limit the relative movement of said handle and support.

4. In the manufacture of a handle assembly, the curving of tubing to shape and inturning of its end portions toward each other, the insertion of the ends of a rod within the inturned end portions of the tubing and securing of the rod to the inturned end portions, and the mounting of a clip upon the rod and between the ends of the inturned end portions.

5. In a handle assembly, the combination with a body portion formed of tubing, and a bearing portion cooperating with said body portion to form a continuous handle, said bearing portion being of less diameter than said body portion to form spaced shoulders.

In testimony whereof I affix my signature.

STANLEY W. NICHOLSON.